United States Patent
Dunlap et al.

(10) Patent No.: US 9,987,944 B2
(45) Date of Patent: Jun. 5, 2018

(54) ELECTRIC VEHICLE OPPORTUNISTIC CHARGING SYSTEMS AND METHODS

(71) Applicant: Ford Global Technologies, LLC, Dearborn, MI (US)

(72) Inventors: Brock Dunlap, Plymouth, MI (US); Bryan Michael Bolger, Canton, MI (US); Angel Fernando Porras, Dearborn, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 14/935,523

(22) Filed: Nov. 9, 2015

(65) Prior Publication Data

US 2017/0129359 A1   May 11, 2017

(51) Int. Cl.
*H01M 10/44* (2006.01)
*H01M 10/46* (2006.01)
*B60L 11/18* (2006.01)

(52) U.S. Cl.
CPC ....... *B60L 11/1861* (2013.01); *B60L 11/1848* (2013.01); *B60L 11/1874* (2013.01)

(58) Field of Classification Search
CPC .......... H02J 7/0021; H02J 7/0026; H02J 7/14; H02J 7/1438; H02J 7/1453
USPC ............... 320/104, 107, 108, 109, 132, 149; 180/65.1, 65.21, 65.26, 65.28; 903/905, 903/906, 907
See application file for complete search history.

(56) References Cited

U.S. PATENT DOCUMENTS

| | | | |
|---|---|---|---|
| 6,459,175 B1 * | 10/2002 | Potega | B60L 11/185 307/132 M |
| 7,769,505 B2 * | 8/2010 | Rask | B60K 6/24 180/65.275 |
| 8,489,267 B1 * | 7/2013 | Lombardo | B60H 1/00314 123/299 |
| 8,972,088 B2 | 3/2015 | Kozloski et al. | |
| 2012/0179311 A1 | 7/2012 | Skaff et al. | |
| 2013/0166119 A1 * | 6/2013 | Kummer | H01M 10/443 701/22 |
| 2014/0149010 A1 | 5/2014 | Li | |
| 2015/0025727 A1 | 1/2015 | Engman et al. | |
| 2015/0134174 A1 | 5/2015 | Preece | |
| 2017/0072813 A1 * | 3/2017 | Martin | B60L 11/1874 |

FOREIGN PATENT DOCUMENTS

DE   102010029971 A1   12/2011
DE   102013224349 B3    3/2015

* cited by examiner

*Primary Examiner* — Edward Tso
(74) *Attorney, Agent, or Firm* — David B. Kelley; Brooks Kushman P.C.

(57) ABSTRACT

A vehicle includes an electric machine arranged to exchange power with a traction battery. The vehicle also includes a thermal conditioning system for influencing a battery temperature and a controller programmed to schedule battery charging. In response to a temperature of the traction battery exceeding a threshold, the controller issues a command to operate the thermal conditioning system prior to a scheduled battery charge to achieve a predetermined battery temperature at a start of battery charging.

13 Claims, 8 Drawing Sheets

ELECTRIC VEHICLE OPPORTUNISTIC CHARGING SYSTEMS AND METHODS

TECHNICAL FIELD

This application is generally related to charging a traction battery of a hybrid-electric vehicle using an engine.

BACKGROUND

Hybrid-electric vehicles can include an internal combustion engine (ICE), at least one electric machine that may be configured as an electric motor or as an electric generator and a traction battery. The traction battery provides power to the electric machine for propulsion and supplies certain accessory loads. Vehicles that utilize a high-voltage traction battery may be referred to as electrified vehicles. The traction battery has a state of charge (SOC) that indicates how much electric charge is held in the battery. To increase the SOC, a hybrid-electric vehicle may employ multiple methods including charging the traction battery using the momentum of the vehicle to turn a generator, operating the ICE to turn the electric machine configured as a generator, and electrically coupling the traction battery to an external charging source, also referred to as "plugging in" the car. Recharging the traction battery using the ICE can cause increased fuel consumption.

SUMMARY

According to aspects of the present disclosure, a vehicle includes an electric machine arranged to exchange power with a traction battery. The vehicle also includes a thermal conditioning system for influencing a battery temperature and a controller programmed to schedule battery charging. In response to a temperature of the traction battery exceeding a threshold, the controller issues a command to operate the thermal conditioning system prior to a scheduled battery charge to achieve a predetermined battery temperature at a start of battery charging.

According to other aspects of the present disclosure, a vehicle includes a traction battery to provide stored energy for propulsion. The vehicle also includes an engine to output power for propelling the vehicle and selectively charging the traction battery. The vehicle further includes a controller programmed to, in response to an accessory power demand greater than a power threshold, issue a command to increase output of the engine in excess of an output required for propulsion such that excess engine output supplies the accessory power demand.

According to further aspects of the present disclosure, a vehicle includes a traction battery to provide stored energy for propulsion. The vehicle also includes an engine to output power for propelling the vehicle and selectively charging the traction battery. The vehicle further includes a controller programmed to, in response to an accessory power demand greater than a threshold while a user-selected high efficiency mode is enabled, issue a command to reduce power available to a vehicle accessory to be less than the accessory power demand in favor of maintaining a predetermined traction battery charge rate.

DETAILED DESCRIPTION

Figure 1:
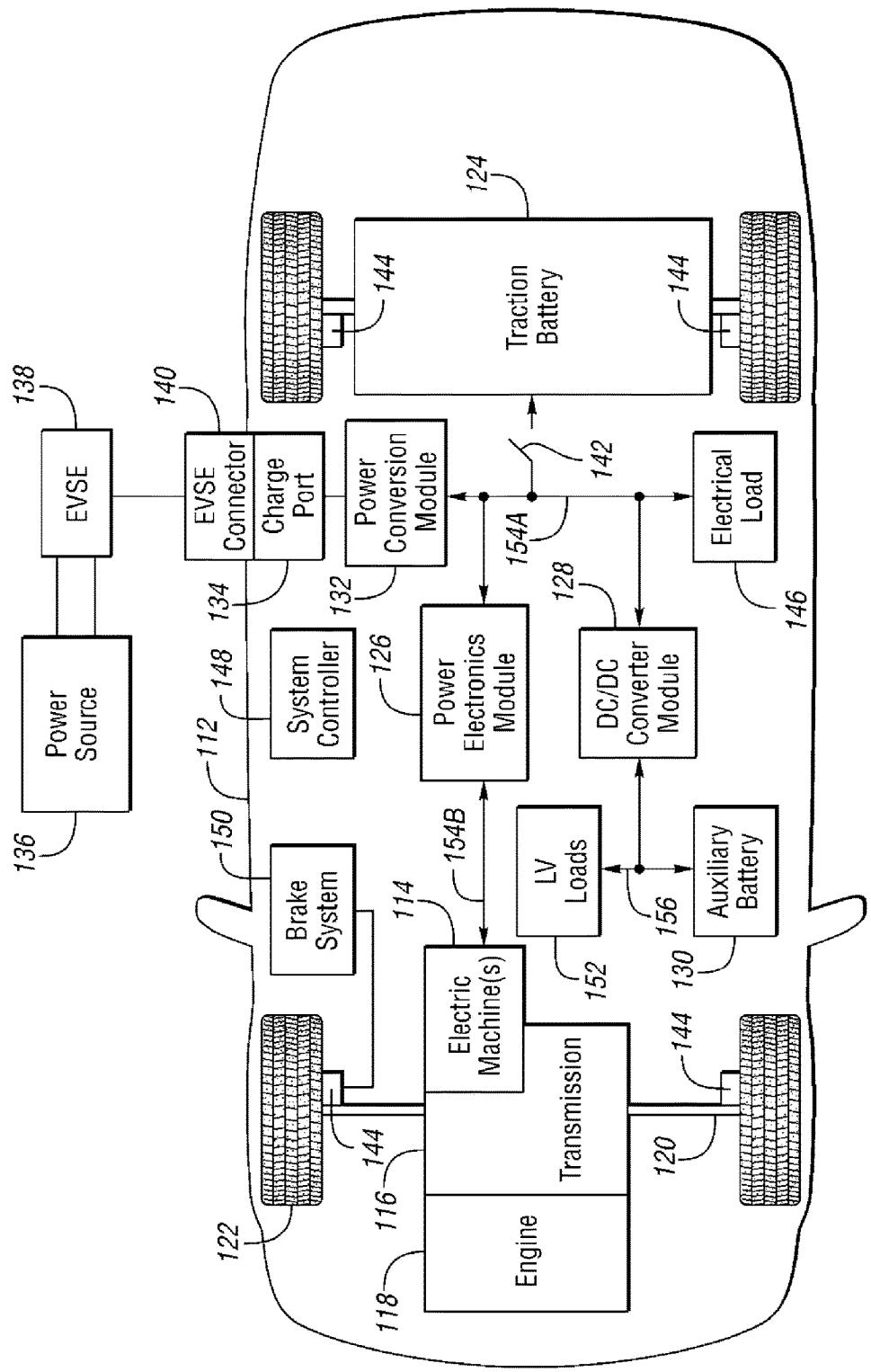
FIG. 1 is a diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As a hybrid vehicle is operated, the state of charge (SOC) of the traction battery varies related to power depletion and recharge cycles. Often it is desirable to maximize the utilization of the energy stored in the battery by converting the electric energy to propulsive power for the vehicle. When the vehicle is at rest, the vehicle can be plugged in to a utility power grid to charge the battery. The rate at which a plug-in hybrid vehicle charges from an electric charge station is limited by station factors including the rating of the outlet the charge station. Examples of limitations include a 110V AC outlet with a 15 amp circuit breaker providing a maximum of about 1.4 kilowatts of charging power, or a 240V AC outlet with a 50 amp circuit breaker providing a maximum of 12 kilowatts of charging power. The maximum charge rate can be reduced due to losses in converting AC current into DC current for receipt at a battery. However, an internal combustion engine turning a generator may output as much as 35 kilowatts or more. Charging the battery using the engine as the power source can enable significantly faster charging compared to charging with a standard 110V/20 amp AC outlet. Typically, once plugged-in, a vehicle operator desires to maximize utilization of the electric energy from the utility company. During drive cycles it may be desirable to strategically allocate a portion of the output of the engine as the vehicle operates to generate a current to recharge the battery. As discussed in more detail below, the desired allocation of battery charging from the engine may be based on predicting upcoming vehicle operating conditions, and selectively charging the battery to achieve desired battery charge levels throughout operation during the upcoming conditions. Related to the petrol consumption of the engine, it may be further desirable to target a preferred recharge rate to maximize the efficiency of the engine.

FIG. 1 depicts a plug-in hybrid-electric vehicle (PHEV). A PHEV 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability either while the engine 118 is operated or turned off. The electric machines 114 are capable of operating as generators and provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the PHEV 112 may be operated in electric-only mode using the electric machines 114 as the sole source of propulsion.

A traction battery or battery pack 124 stores energy that can be used by the electric machines 114. The battery pack 124 typically provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. For example, a traction battery 124 may provide a DC current while the electric machines 114 may operate using a three-phase alternating current (AC) to function. The power electronics module 126 may convert the DC current to a three-phase AC current to operate the electric machines 114. In a regenerative mode, the power electronics module 126 may convert the three-phase AC current output from the electric machines 114 acting as generators to the DC current compatible with the traction battery 124. The description herein is equally applicable to a pure electric vehicle.

In addition to providing energy for propulsion, the traction battery 124 may provide energy for other vehicle electrical systems. A vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage systems 152 may be electrically coupled to the low-voltage bus 156. The low-voltage system 152 may include various controllers within the vehicle 112.

The traction battery 124 of vehicle 112 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands via a brake pedal and may also operate autonomously to implement features such as stability control. The controller of the brake system 150 may implement a method of applying a requested brake force when requested by another controller or sub-function.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters. For example, the air conditioning system may draw as much as 6 kW under high cooling loads.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

During an ignition-off condition, the contactors 142 may be in an open state so that the traction battery 124 does not provide power to the high-voltage bus 154. During the ignition-off condition, the traction battery 124 may be decoupled from the auxiliary battery 130. During the ignition-off condition, selected electronic modules (e.g., low-voltage loads 152) may be active. For example, a theft-deterrent system and a remote keyless entry system may continue to be active. The active systems may draw current from the auxiliary battery 130. In some configurations, low-voltage loads 152, such as lamps, may be accidently left in an active condition and draw current from the auxiliary battery 130, which may increase a rate of discharge of the auxiliary battery 130. During the ignition-off condition, the low-voltage loads 152 may be configured to minimize current draw.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

System controller 148, although represented as a single controller, may be implemented as one or more controllers. The controller 148 may monitor operating conditions of the traction battery 124, the power conversion module 132 and the electric machine 114. The traction battery 124 includes a current sensor to sense a current that flows through the traction battery 124. The traction battery 124 also includes a voltage sensor to sense a voltage across terminals of the traction battery 124. The voltage sensor may output a signal indicative of the voltage across the terminals of the traction battery 124. The traction battery current sensor may output a signal of a magnitude and direction of current flowing into or out of the traction battery 124.

The power conversion module 132 also includes a current sensor to sense a current that flows from the EVSE 138 to the traction battery 124. The engine 118 coupled to the electric machine 114 generates an AC current that is converted to a DC current by the power electronics module 126. The engine 118 may be controlled by a powertrain control module having at least one controller in connection with the system controller 148. The current sensor of the power conversion module 132 may output a signal indicative of a magnitude and direction of current flowing from the EVSE 138 to the traction battery 124.

The current sensor and voltage sensor outputs of the traction battery 124 are provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The state of charge may also be estimated based on the output of the traction battery voltage sensor 104. The specific technique utilized may depend upon the chemical composition and characteristics of the particular battery.

The controller 148 may be configured to monitor the status the traction battery 124. The controller 148 may include a processor that controls at least some portion of the operation of the controller 148. The processor allows onboard processing of commands and routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

A state of charge operating range may be defined for the traction battery 124. The operating ranges may define an upper and lower limit at which the state of charge may be bounded for the battery 124. During vehicle operation, the controller 148 may be configured to maintain the state of charge of the battery 124 within the associated operating range. In this regard, the battery may be recharged by the engine while the vehicle is in operation. In at least one embodiment, torque output from the engine is allocated to the electric machine to recharge the battery in response to the SOC being depleted to a SOC low threshold. Based on a rate of battery depletion, charging of the traction battery may be scheduled in advance based on approaching the SOC low threshold. In addition, planning for known upcoming vehicle operating conditions allows the controller to schedule powertrain operation in order to conserve or generate stored energy for predetermined EV mode operation for extended periods along a trip. The timing and rate of charging may also be opportunistically selected to take best advantage of the upcoming vehicle operating conditions to maximize charging efficiency.

Figure 2:
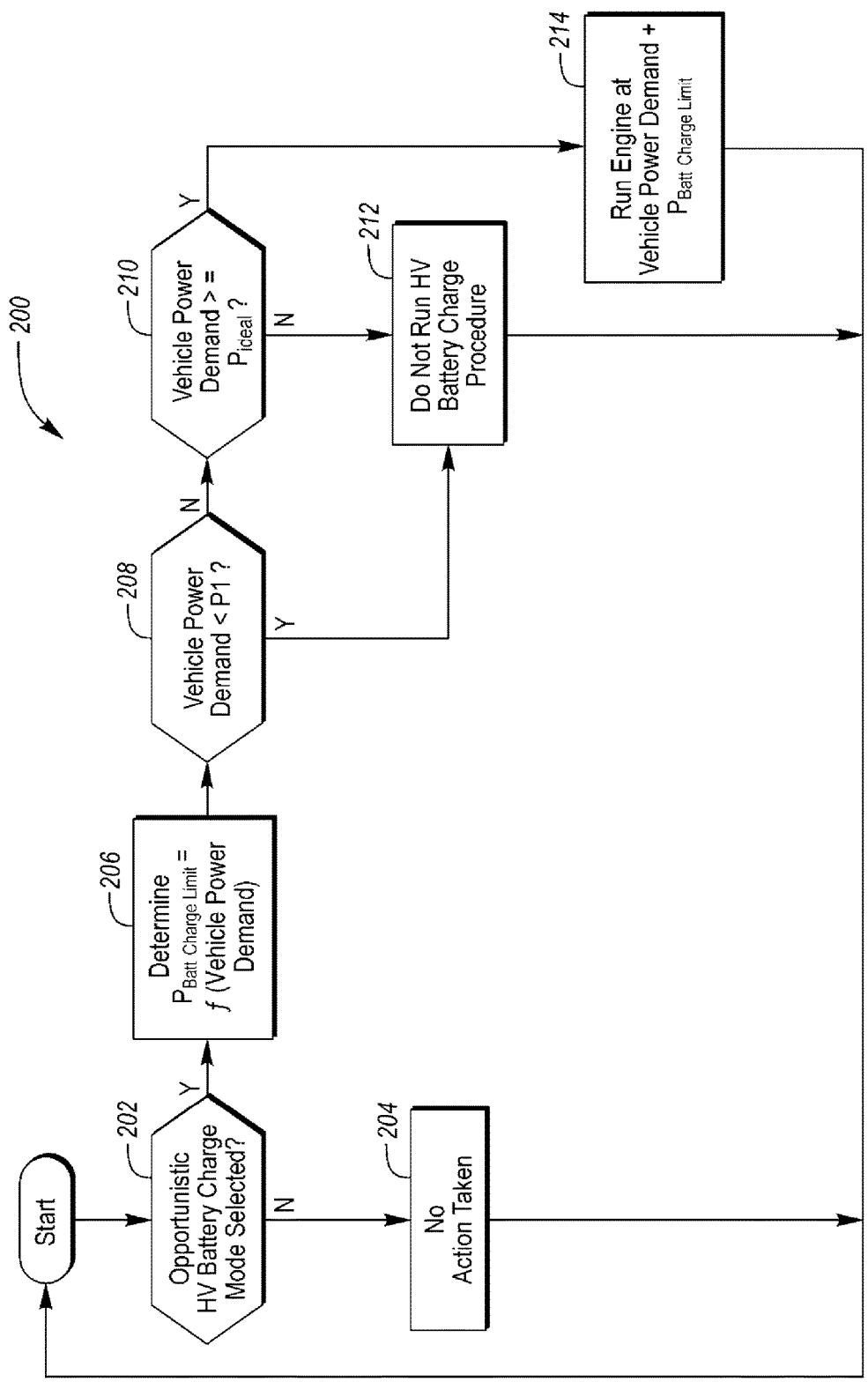
FIG. 2 is a flowchart of a method of opportunistic battery charging according to engine BSFC.

Referring to FIG. 2, a method 200 of selecting an optimal charge rate is used to balance efficient engine operation with the need to recharge the battery. At step 202 the controller assesses whether the opportunistic traction battery charging mode is enabled. If opportunistic charging is not enabled at step 202, the controller may rely on standard charging procedures at step 204 without regard to customizing a battery charge rate. If opportunistic charging is enabled at step 202, the controller may determine at step 206 the charge power limit threshold, $P_{Batt\ Charge\ Limit}$. The power limit threshold is based on overall power demands on the engine, and a predetermined limit above which the engine does not efficiently produce power. The engine has a maximum overall power output, and a certain portion of power output is devoted to vehicle propulsion and satisfying vehicle accessory power loads. Under certain conditions, providing engine power for battery charging in addition to propulsion power would require the engine to operate at such high output that the fuel penalty to recharge the battery outweighs the benefit of recharging. That is, the energy expended to recharge may cost significantly more than the energy recovered. The $P_{Batt\ Charge\ Limit}$ may be characterized by a profile where the limit is reduced at low vehicle speeds to avoid running the engine at a high output to provide charge power. This condition may be undesirable related to high engine noise at low speeds. At moderate speeds, for example around 55 mph, the engine has more power capacity available to allocate to charging without compromising customer expected noise output. During this condition, the $P_{Batt\ Charge\ Limit}$ may be increased without an efficiency penalty. At high speeds, for example around 80 mph, much of the engine power capacity is required to meet road load requirements and propel the vehicle. In this case the $P_{Batt\ Charge\ Limit}$ may be again reduced to avoid running the engine under high output, inefficient conditions.

A vehicle engine may have an optimal power output corresponding to the current vehicle conditions. One way to assess efficiency of engine power output is by measuring brake specific fuel consumption (BSFC). The BSFC is a measure of the rate of fuel consumption divided by the energy produced by the engine. The values are commonly expressed in units of g/kW·h. The value normalizes engine performance, and is often used to compare efficiency of different engines and different operating conditions. Every engine carries different BSFC values. During engine development, a map of engine performance for all steady state operating conditions may be determined. Based on engine speed and engine torque to obtain a desired power output and vehicle speed, the operating points may vary across the BSFC map. The power allocated to charge battery may require an increase in the engine power output and shift the operating point compared to non-charging steady state conditions. $P_{Batt\ Charge\ Limit}$ can be determined by targeting an optimal BSFC operating point of the engine, $P_{ideal}$ while charging. In at least one embodiment, $P_{Batt\ Charge\ Limit}$ is determined by subtracting the vehicle power demand from the optimal BSFC operating point of the engine $P_{ideal}$. Often the vehicle power demand is the sum of power required to propel the vehicle plus any accessory power demand.

Figure 3:
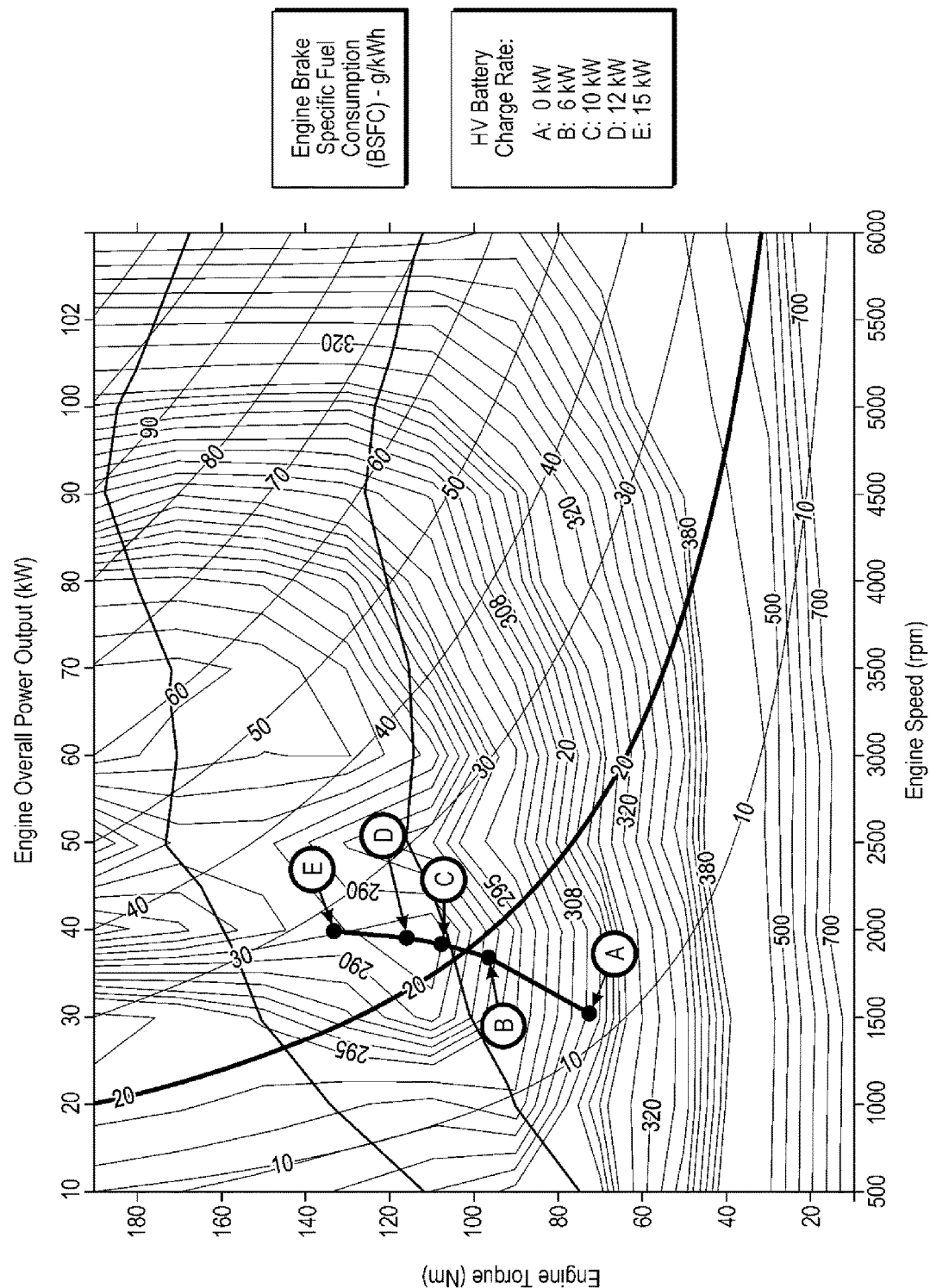
FIG. 3 is a map of engine BSFC showing example engine operating points.

Referring to FIG. 3, an example BSFC map illustrates the selection of the optimal BSFC operating point of the engine $P_{ideal}$ as discussed above. The lower horizontal axis represents engine speed in rotations per minute (rpm), and the vertical axis represents engine toque in Nm. The upper horizontal axis represents overall engine output in kW. The engine map represented by the contour lines reflects different engine operating efficiency in g/kW·h. By way of example, curve A-B-C-D-E on the BFSC map corresponds to engine operation while the vehicle travels at 55 mph across a range of battery charge rates. It should be appreciated that at different vehicle speeds and gear ratios the operating points may shift to different areas on the BSFC map.

The curve represented by points A through E shows a range of traction battery charge rates while driving at 55 mph. Point A represents a condition where 0 kW is allocated to battery charging, and about 13 kW is devoted to vehicle propulsion. In this case all power produced is devoted to satisfying vehicle power demand. Point A corresponds to a BSFC of about 310 g/kW·h. To provide power to the battery, engine speed and torque are increased to generate excess power to output torque to the electric machine for charging. Point B represents a condition where 6 kW is allocated to battery charging and a total engine output of about 19 kW. The operating condition corresponding to point B delivers a BSFC of about 293 g/kW·h, which is improved over point A. At point C power allocated to battery charging is increased to 10 kW. The overall engine output is also increased to about 23 kW in order to provide the required 13 kW for propulsion. The BSFC of engine operation at point C is improved relative to point B to about 289 g/kW·h. At point D charge power allocated to battery charging 12 kW where overall engine output is about 25 kW. Engine BSFC is further improved slightly to less than 289 g/kW·h, as seen by the location of point D within the "sweet spot" shown on the BSFC contour map. At point E battery charging is further increased to 15 kW and overall engine output is about 28 kW. However it can be seen that BSFC is degraded to greater than 289 g/kW·h when further increasing engine output from operating point D to operating point E.

According to the engine BSFC map depicted in FIG. 3, point D reflects the optimal BSFC operating point of the engine, $P_{ideal}$, and is about 25 kW. In the example shown, the desired power allocated for battery charging, $P_{Batt\ Charge}$, is 12 kW, and the road load required to propel the vehicle, $P_{Road\ Load}$, is 13 kW. Because operating points A through E may shift to different locations on the BSFC map at different vehicle speeds and gear ratios, a different optimal BSFC operating point of the engine, $P_{ideal}$ may be more suitable under other conditions. In at least one embodiment, a controller stores in memory a value for a predetermined optimal BSFC operating point of the engine for each of a variety of vehicle operating conditions. In this way charging power may be varied as vehicle operating conditions change in order to provide more efficient engine operation. Although five operating points is shown by way of example, any number of points may be used to generate an operating curve to determine optimal charge power to reduce engine BSFC.

While opportunistic charging generally biases engine operation towards operation at the best BSFC available for the conditions, it may not be desirable to run the engine at an efficient BSFC for all conditions. As discussed above it is possible to run the engine at a higher load than required in order to charge efficiently, but at low speeds this comprises user convenience by producing increased engine noise, vibration, and harshness (NVH). Generally customers have come to expect primarily silent or low-noise powertrain operation at low vehicle speeds.

Figure 4:
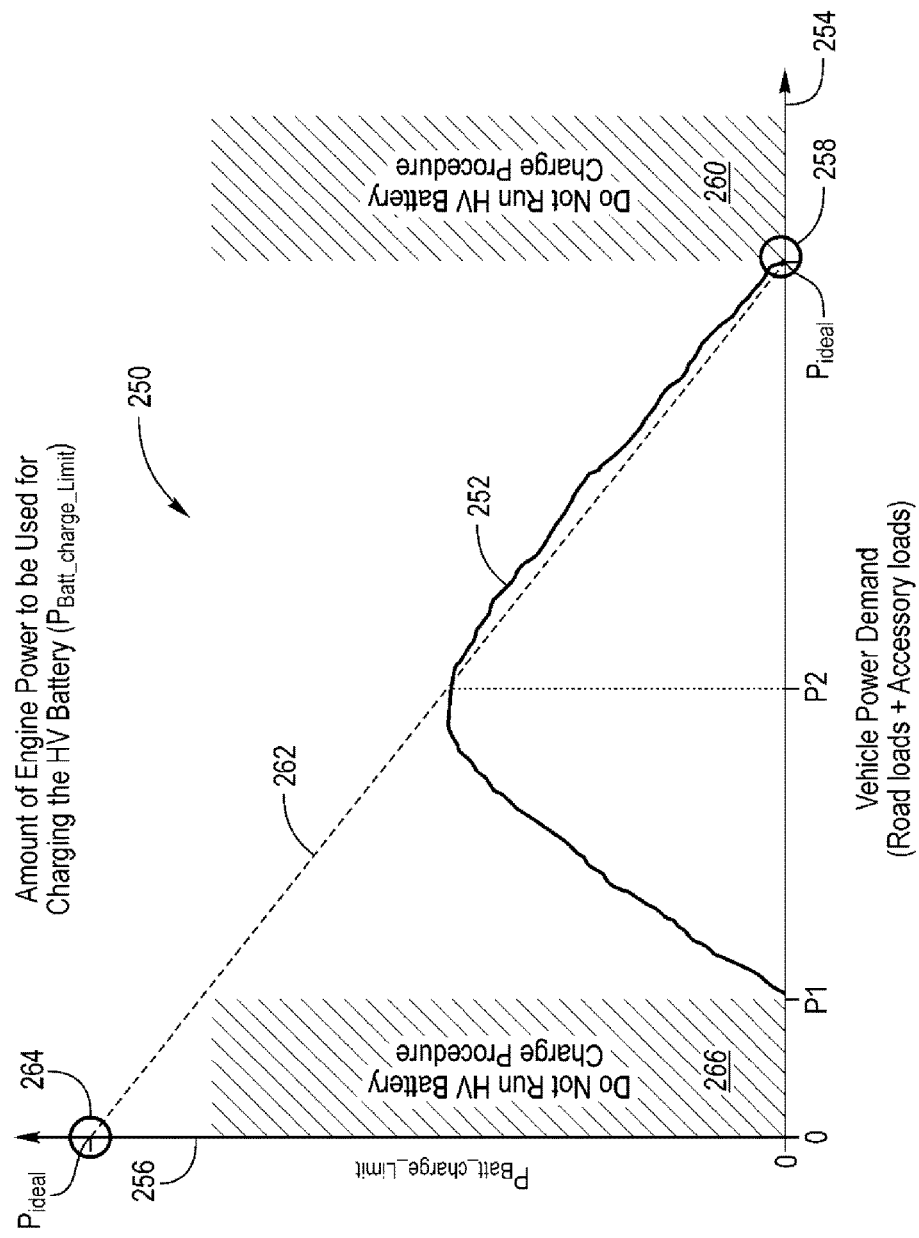
FIG. 4 is plot of a battery charge limit as a function of vehicle power demand.

Referring to FIG. 4, a plot 250 depicts an embodiment of how the battery charging limit 252 using the engine as a power source may be varied as a function of vehicle power demand. The horizontal axis 254 represents vehicle power demand. The vertical axis 256 represents the variable battery charge power limit $P_{Batt\ Charge\ Limit}$. As described above, $P_{Batt\ Charge\ Limit}$ may be determined by subtracting vehicle power demand from $P_{ideal}$ based on the engine BSFC for the given vehicle operating conditions. This relationship causes $P_{Batt\ Charge\ Limit}$ to approach zero near point 258 as vehicle power demand increases to a value equal to $P_{ideal}$. In area 260 of FIG. 4, engine power is not used to charge the high voltage battery when vehicle power demand is sufficiently high. In at least one embodiment the controller is programmed to issue a command to cease charging of the traction battery in response to vehicle power demand being greater than a power level corresponding to $P_{ideal}$.

While taking a difference between $P_{ideal}$ and vehicle power demand is suitable in certain ranges of powertrain operation, at low vehicle speeds (which are related to low vehicle power demand), it may be desirable to reduce engine power output to reduce powertrain NVH and increase customer comfort. For example, dotted line 262 is a hypothetical available battery charging power based on subtracting vehicle power demand from $P_{ideal}$. As vehicle power demand is reduced toward zero, for example when the vehicle is idled, the theoretical engine power available for charging approaches a value equal to $P_{ideal}$ near point 264. However it may be undesirable to operate the engine at high power output to charge the battery while the vehicle is propelled at low speeds or idled. In area 266 of FIG. 4, engine power is not used to charge the high voltage battery when vehicle power demand is sufficiently low. In at least one embodiment, the controller is programmed to issue a command to cease charging of the traction battery in response to vehicle power demand being less than a first power threshold P1.

Short of preventing charging altogether, the variable battery charge limit $P_{Batt\ Charge\ Limit}$ may be reduced at intermediate speeds by metering engine power output to a value less than $P_{ideal}$ to reduce NVH. In the example of FIG. 4, the battery charge limit is tapered down toward zero in response to vehicle power demand being less than a second power threshold P2 and greater than the first power threshold P1. While an approximately linear reduction of the battery charge limit is depicted, it is envisioned that various types of reduction profiles may be suitable to manage powertrain NVH according to the particular engine in use and customer expectations for vehicle allowable NVH. In at least one embodiment, the controller is programmed to issue a command to adjust the engine output torque and output speed corresponding to a maximum NVH threshold while vehicle power demand is less than a second power threshold P2.

Referring back to FIG. 2, once $P_{Batt\ Charge\ Limit}$ is determined as a function of vehicle power demand at step 206, the controller compares the vehicle power demand to power threshold P1 at step 208. If the vehicle power demand is sufficiently low, the controller prevents battery charging using the engine even though excess engine power may be available. If vehicle power demand is less than power threshold P1 at step 208 the powertrain will not run high voltage battery charging procedure using the engine as a power source at step 212.

If vehicle power demand is greater than power threshold P1 at step 208, the controller compares the vehicle power demand to optimal operating point of the engine, $P_{ideal}$ at step 210. If the vehicle power demand is greater than or equal to $P_{ideal}$, the controller issues a command at step 212 to prevent battery charging using the engine based on the large portion of engine power devoted to satisfy vehicle power demand.

If at step 210 vehicle power demand is less than or equal to $P_{ideal}$, the controller may issue a command at step 214 to adjust the operating speed and torque of the engine to correspond to power output $P_{ideal}$ based on optimizing the available BSFC of the engine at the present vehicle speed. In this case the power output of the engine would equal the sum of the vehicle power demand and the $P_{Batt\ Charge\ Limit}$. As discussed above the $P_{Batt\ Charge\ Limit}$ varies as a function of the vehicle power demand and may be governed by different variables over different ranges of powertrain operation. The controller may also execute method 200 in a looping fashion to repeatedly poll the vehicle operating conditions and make charging power adjustments to ensure the most efficient engine operation possible for the present operating conditions.

Figure 5:
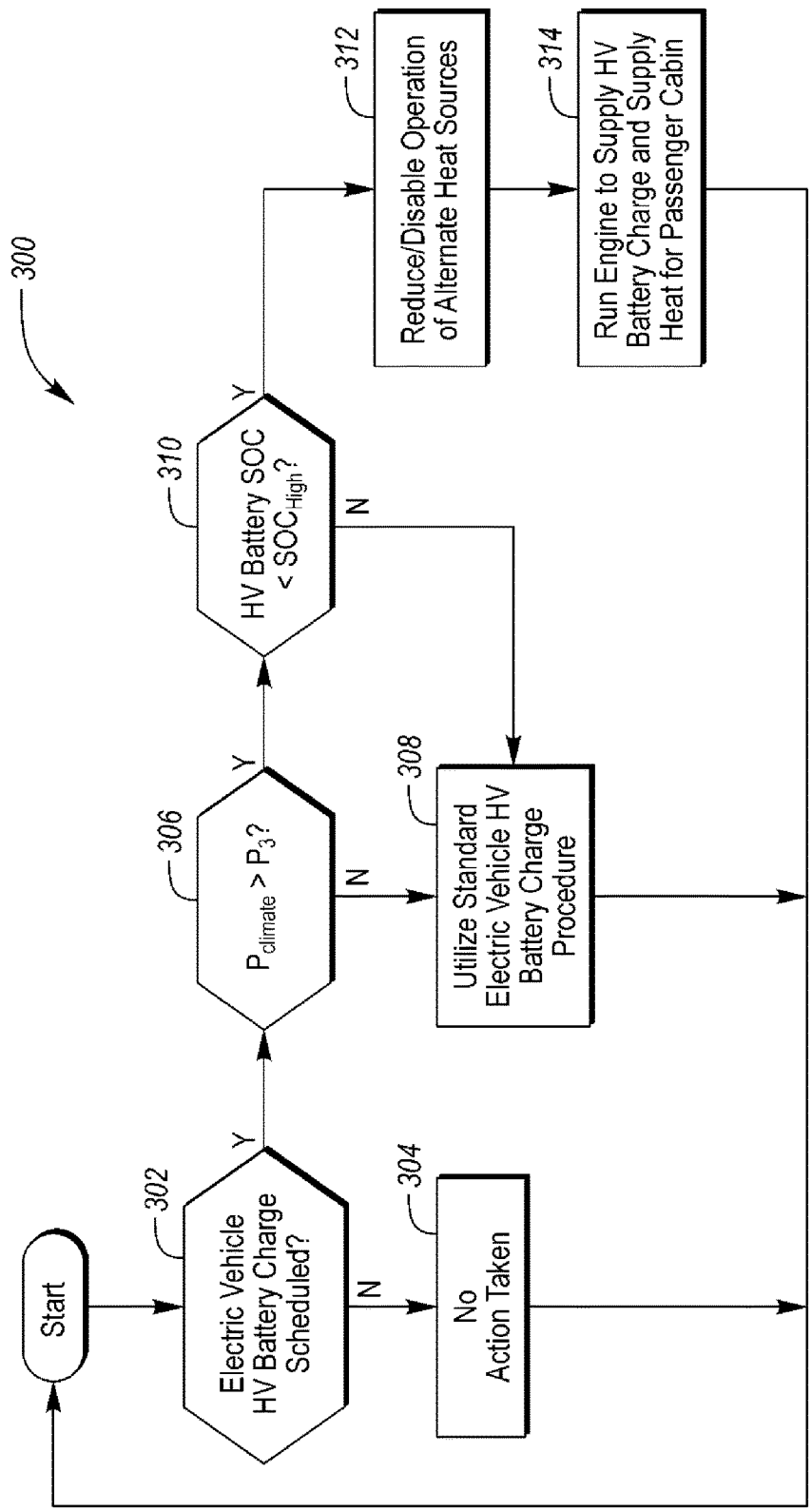
FIG. 5 is a flowchart of a method of opportunistic battery charging combined with passenger cabin heating.

Referring to FIG. 5, a method 300 is depicted showing an embodiment of opportunistic battery charging. The powertrain controller may be programmed to determine whether EV charging is required based on the SOC of the high voltage battery. In some cases, when EV charging is enabled, the controller may predict an EV charge cycle in advance or schedule charging based on expected battery energy depletion. In one example, location may be used for such a determination. When the vehicle is returning to its home charge location, the controller may 'schedule' an upcoming charge cycle based on the rate of travel and distance to the home charge station. Similarly, driving available range or electrical DTE may be used in a similar fashion. Based on driving conditions, the controller may predict an upcoming charge cycle based on battery SOC and rate of depletion. In a further example, a vehicle user may input a predetermined trip which passes through an EV-preferred location requiring operation in electric-only mode, such as a city center. It may be a customer expectation that the hybrid vehicle powertrain operates quietly in electric-only EV mode during low-speed driving. The EV range needed to complete the trip may be greater than the available charge in the high voltage battery. In this case the controller may schedule charging modes while driving in areas outside of the EV-preferred location to ensure sufficient EV range to operate in electric-only mode while in the upcoming EV-preferred location. Forecasting of upcoming electric-only situations may also prompt advanced scheduling of opportunistic charging based on user trip information. At step 302 if no battery charge cycle is scheduled, the controller may take no opportunistic charge action at step 304, and resort to a default operating mode.

If at step 302 a battery charge cycle is scheduled, the controller may consider whether a power demand of the climate control heating system, $P_{Climate}$, is greater than a predetermined power threshold, P3, at step 306. If the climate control system is disabled or $P_{Climate}$ is less than P3, the controller may utilize standard charge procedure scheduling at step 308. According to an aspect of the present disclosure, the power demand of the climate control system corresponds to a passenger cabin heating request.

If climate control heating system power demand, $P_{Climate}$ is sufficiently high at step 306, the controller may consider at step 310 whether the battery has capacity to be charged. If at step 310 the battery SOC is equal to or greater than a charge threshold $SOC_{High}$, the controller may utilize standard charge procedure scheduling at step 308.

If at step 310 the battery SOC is less than the charge threshold $SOC_{High}$, this indicates that the battery has capacity to accept charge power. The controller may then issue commands to utilize the engine to generate heat demanded from the climate control system. Heat from engine operation is generally dissipated as waste, but in this condition it may be advantageous to opportunistically use the engine for both battery charging and heat generation. At step 312 the controller may issue a command to reduce or disable the conventional heat sources such as a high voltage electric heater.

At step 314, the controller may issue a command to run the engine to output power sufficient to supply battery charge power as well as generate heat to warm the passenger cabin responsive to the heating request. An advantage is realized in that heat generated that is normally wasted is used to meet a customer desired function. According to an aspect of the present disclosure the controller may issue a command to increase the output of the engine in excess of an output required for propulsion such that excess engine output supplies the accessory power demand. The battery SOC is recovered during the heating cycle by running the engine, as opposed to depleting the battery from running a high voltage electric heater to warm the passenger cabin.

Figure 6:
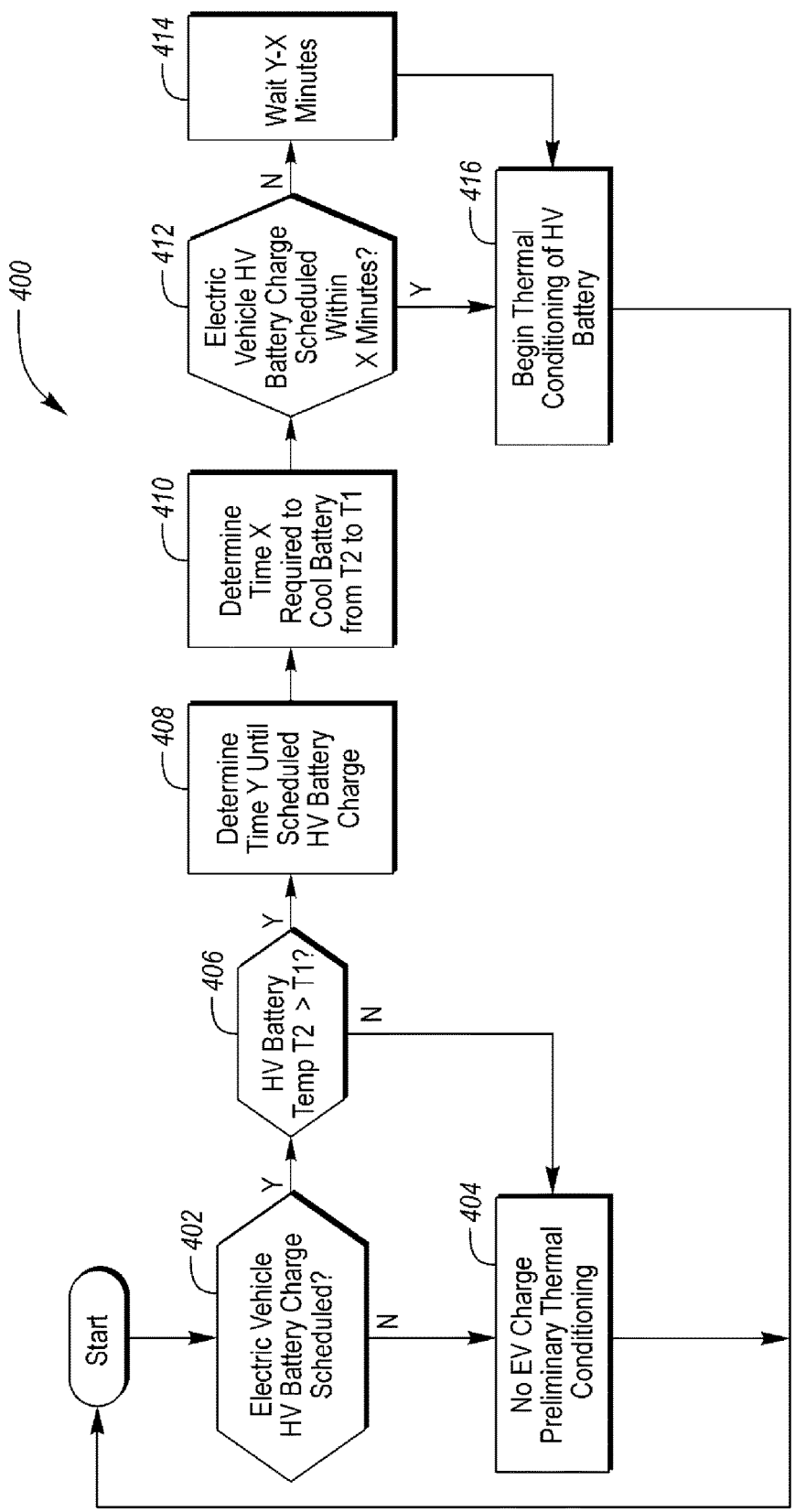
FIG. 6 is a flowchart of a method of thermally preconditioning of a battery prior to a charge procedure.

Referring to FIG. 6, a method 400 is depicted for thermally conditioning a battery for an upcoming charge procedure. As discussed above, the powertrain controller may be equipped to determine whether EV charging is required based on the SOC of the high voltage battery and predict an EV charge cycle in advance or schedule charging based on expected battery energy depletion. At step 402 if no battery charge cycle is scheduled, the controller may perform no preliminary thermal conditioning step at step 404, and resort to a default operating mode.

If at step 402 a battery charge cycle is scheduled, the controller may consider at step 406 whether the current battery temperature $T_2$ is greater than a desired predetermined temperature threshold $T_1$. The battery may generate heat during depletion and charging cycles. Related to efficient charging it is desirable to maintain the battery within a certain temperature range. Charging the battery at high temperatures may contribute to capacity losses, shortening the overall life cycle of the battery. Additionally, if the high voltage battery gets too warm during use, the battery controller may reduce the discharging limit, which may prevent EV operation at the desired future time. The battery system includes a battery thermal conditioning system to cool or warm the battery cells to maintain the battery temperature within a predetermined temperature range during operation. The cooling portion of the thermal conditioning system may include a number of fans to promote cooling through convection through air circulation. Similarly, the cooling portion of the thermal conditioning system may include a liquid coolant circulation system to remove heat from the battery. Additionally, the battery cooling system may include a battery chiller to further aid in regulating battery temperature. A chiller is a coolant-to-refrigerant heat exchanger similar to cabin A/C evaporator which is an air-to-refrigerant heat exchanger.

If at step 406 the current battery temperature $T_2$ is less than the temperature threshold $T_1$, the controller may take no preliminary thermal conditioning action at step 404, and resort to a default operating mode. However, if at step 406 the current battery temperature $T_2$ is elevated above the temperature threshold $T_1$, the controller may estimate at step 408 the time Y until the next upcoming battery charge. At step 410 the controller may determine the amount of time X required to cool the battery from the current battery temperature $T_2$ to the temperature threshold $T_1$. In one example $T_1$ represents an upper limit of a predetermined desired operating temperature range. More specifically, T1 may be the temperature above which a charging efficiency of the traction battery is reduced. In additional embodiments, $T_1$ is less than the upper limit of the predetermined desired operating temperature range to provide a temperature buffer and prevent on-and-off cycling of the battery thermal conditioning system.

At step 412 the controller may determine whether there is sufficient time to thermally condition the battery prior to the upcoming charge procedure. In other words, if time duration Y is greater than time duration X, it indicates that there is more than sufficient time to condition the battery before the upcoming charge. If at step 412 the upcoming charge is not scheduled within X minutes of the present time, the controller may wait at step 414 for a time equal to the difference between the time duration Y before charge and the time duration X required to cool the battery. Stated another way, if time duration Y is greater than time duration X, the controller may delay for a time duration equal to the difference between Y and X. Once the time Y before charge is equal to the time X required to cool the battery, the controller may issue a command at step 416 to begin the thermal conditioning of the battery to achieve battery temperature $T_1$ prior to charging. In at least one embodiment, the battery thermal conditioning system is operated at a predetermined time prior to the start of the scheduled battery charge cycle based on an amount of time required to cool the traction battery to a achieve a predetermined battery temperature at a start of battery charging.

If at step 412 the time before charge Y is equal or less than to the time to cool the battery X, the controller may issue a command at step 416 to immediately begin the thermal conditioning of the battery.

Figure 7:
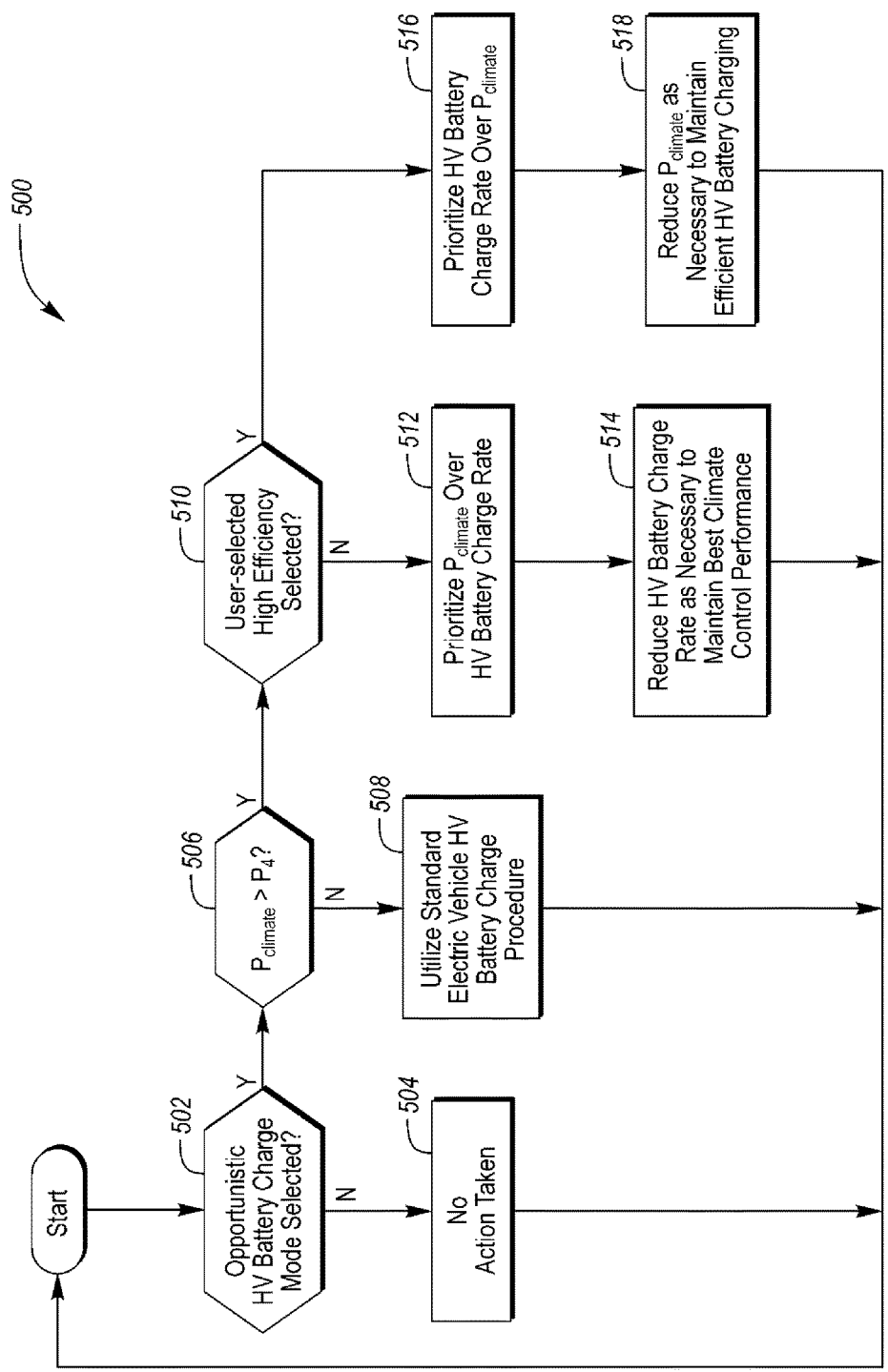
FIG. 7 is a flowchart of a method of opportunistic battery charging according to a user-selected priority mode.

Referring to FIG. 7, a method 500 is depicted for opportunistically prioritizing battery charging over other certain climate control functions. At step 502 the controller assesses whether opportunistic battery charge mode is enabled. If opportunistic charging is disabled at step 502, the controller may implement default battery charging control algorithms at step 504.

If opportunistic charging is enabled at step 502, the controller determines whether a passenger cabin climate control power demand $P_{Climate}$ from the climate control system is greater than a predetermined power threshold P4. If at step 506 $P_{Climate}$ is less than P4, then the controller may implement other opportunistic charging control algorithms at step 508 such as other techniques described in the present disclosure.

If at step 506 $P_{Climate}$ is greater than the power threshold P4, then the controller may determine whether a user-selected "high efficiency" mode is implemented. In at least one embodiment, a user-selected high efficiency mode forces vehicle powertrain behavior to more aggressively conserve fuel, even at the expense of certain vehicle performance aspects. This may be achieved by demoting the power draw priority of other vehicle features in favor of efficient engine operation.

If at step 510 the user-selected high efficiency mode is disabled the controller prioritizes climate control power demand $P_{Climate}$ over a desired traction battery charge rate at step 512. According to an aspect of the present disclosure, the controller issues a command to cause power provided to the passenger cabin climate control system to fully satisfy the climate control power demand $P_{Climate}$. At the same time, the controller causes a battery charging power level that is less than an optimal battery charging power level. At step 514 the controller deviates from maintaining a predetermined traction battery charge rate corresponding to optimal brake specific fuel consumption as described above in favor of satisfying the accessory power demand.

If at step 510 the user-selected high efficiency mode is enabled the controller prioritizes traction battery charge rate over climate control power demand $P_{Climate}$ at step 516. In at least one embodiment, the controller issues a command to maintain a target battery charging power level by causing power provided to the passenger cabin climate control system to be less than the power demand $P_{Climate}$. At step 518 the controller may reduce $P_{Climate}$ as necessary to deliver a desired battery charge rate in accordance with efficient engine operation. For example, the controller may be programmed to sacrifice climate control performance to maintain a predetermined traction battery charge rate corresponding to optimal brake specific fuel consumption as described above.

Although method 500 is described in reference to prioritize battery charging versus climate control power demand, similar prioritization may be made for other accessory loads when the user-selected high efficiency mode is selected. In at least one embodiment, the controller may reduce power available to an accessory load in order to maintain a predetermined target rate of charging of the traction battery. In this way the accessory power demand may go only partially satisfied in order to maintain engine operation at a higher priority.

Figure 8:
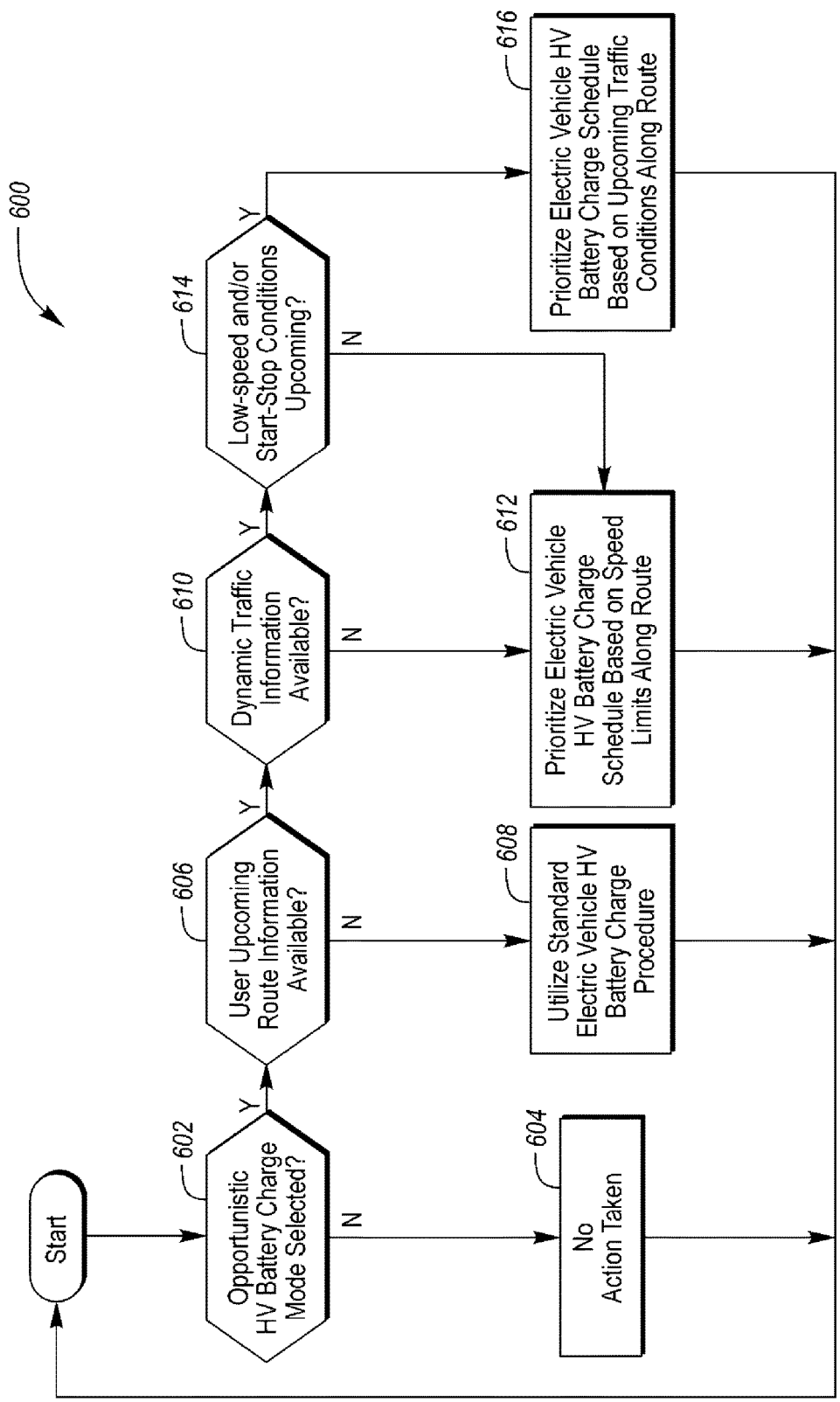
FIG. 8 is a flowchart of a method of opportunistic battery charging according to travel route information.

Referring to FIG. 8, a method 600 is depicted for opportunistically charging the traction battery considering user route information and dynamic traffic information. At step 602 the controller assesses whether opportunistic battery charge mode is enabled. If opportunistic charging is disabled at step 602, the controller may implement default battery charging control algorithms at step 604.

If opportunistic charging is enabled at step 602, the controller determines whether user upcoming route information is available at step 606. User route information may include geographic range data, speed limit data along the route, stop frequency, as well as historical data of user driving along the same route or portions thereof. This layer data including user route information is generally static data, and pertains to established information. If no user route information is available at step 606, the controller may implement other opportunistic charging control algorithms at step 608 such as other techniques described in the present disclosure.

If user route information is available at step 606, the controller considers whether dynamic traffic information corresponding to the route is available. Dynamic traffic data may include current travel speeds of particular portions of the route, accident information, weather, construction, large event release times, and other factors which dynamically impact travel speed. In at least one embodiment, information is broadcast to the vehicle from a central server. Likewise the vehicle transmits its current travel conditions to the server to facilitate communications with other vehicles on the network.

If no dynamic traffic data is available at step 610, the controller may conduct opportunistic battery charging based on the static user route information at step 612. In at least one embodiment the controller considers current battery SOC, the available range, and the particular route to be travelled. In this way the controller may determine in advance the most opportune times to efficiently charge the battery based on speed limits and stop frequency along the route. During low-speed driving it may be a customer expectation that the hybrid vehicle powertrain operates quietly in electric-only EV mode. The systems and methods of the present disclosure account for meeting this expectation. For example if a scheduled charge would be triggered during an upcoming low-speed travel zone along the route causing the engine to run and generate noise levels above customer expectations, the controller may cause charging of the traction battery such that sufficient energy is stored prior to encountering the low-speed travel zone to operate in EV mode. Long stretches of moderate to high speed driving are more conducive to battery charging and therefore may be taken advantage of prior to the formal need for a battery recharge. In this way the controller may operate the powertrain to ensure sufficient battery charge to sustain forecasted extended EV mode operation along the trip.

If dynamic traffic data is available at step 610 the controller may consider how the static route information is affected by the additional layer of dynamic data. At step 614, the controller determines whether any additional low-speed conditions have been added to the known upcoming route. Again, during such low-speed conditions, a driver may expect the hybrid vehicle to operate in electric-only EV mode. If no low-speed or upcoming start-stop conditions have been dynamically added to the upcoming route, the controller may prioritize battery charge scheduling at step 612 based on the static user route information. This prioritization accounts for whether, and to what extent, battery charging while driving will be required to complete the trip.

At step 614 if low-speed or upcoming start-stop conditions have been dynamically added to the upcoming route, the controller may conduct a re-prioritization of the charge scheduling at step 616 based on the dynamic traffic conditions. The controller again determines the most opportune times to efficiently charge the battery based on actual travel speeds and stop frequency along the route while accounting for any upcoming EV mode operation. The dynamic traffic data may indicate slower than normal travel speeds, or start-stop traffic conditions. Based on the updated route information the controller may schedule more aggressive charging of the traction battery compared to a non-opportunistic charge schedule to store energy prior to encountering the low-speed travel zone. In this way sufficient energy is stored to allow for operation in EV mode during desired durations of the trip.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery;
an engine to output power for propelling the vehicle and selectively charging the traction battery; and
a controller programmed to, responsive to receiving indication of upcoming stop-start traffic, schedule battery charging in advance of the stop-start traffic to store sufficient energy to propel the vehicle during the stop-start traffic with the engine off.

2. The vehicle of claim 1 wherein the controller is further programmed to, responsive to an accessory power demand greater than a threshold while a user-selected high efficiency mode is enabled, issue a command to reduce power available to a vehicle accessory to be less than the accessory power demand to maintain a predetermined traction battery charge rate.

3. The vehicle of claim 2 wherein the controller is further programmed to, responsive to an accessory power demand greater than a threshold while the user-selected high efficiency mode is disabled, issue a command to reduce a charging rate of the traction battery to be less than the predetermined traction battery charge rate to satisfy the accessory power demand.

4. The vehicle of claim 2 wherein the accessory power demand comprises a passenger cabin heating request, and the controller is further programmed to issue a command to reduce power provided to an electric heater and operate the engine as a heat source.

5. The vehicle of claim 2 wherein the predetermined traction battery charge rate is based on a brake specific fuel consumption of the engine.

6. A vehicle comprising:
a traction battery;
an engine to output power for propelling the vehicle and selectively charging the traction battery; and
a controller programmed to,
responsive to receiving indication of upcoming stop-start traffic, schedule battery charging in advance of the stop-start traffic to store sufficient energy to propel the vehicle during the stop-start traffic with the engine off, and
responsive to accessory power demand exceeding a threshold during a high efficiency mode, command a reduction of vehicle accessory power to be less than accessory power demand to maintain a predetermined battery charge rate.

7. The vehicle of claim 6 wherein the controller is further programmed to, responsive to transitioning out of the high efficiency mode, command a reduction of the predetermined battery charge rate.

8. The vehicle of claim 6 wherein the accessory power demand comprises a passenger cabin heating request.

9. The vehicle of claim 6 wherein the predetermined battery charge rate is based on a brake specific fuel consumption of the engine.

10. A method comprising:
by a controller,
responsive to receiving indication of upcoming stop-start traffic, scheduling battery charging in advance of the stop-start traffic to store sufficient energy to propel a vehicle during the stop-start traffic with engine off, and
responsive to accessory power demand exceeding a threshold during a high efficiency mode, commanding a reduction in vehicle accessory power to be less than accessory power demand to maintain a predetermined battery charge rate.

11. The method of claim 10 further comprising, responsive to transitioning out of the high efficiency mode, commanding a reduction of the predetermined battery charge rate.

12. The method of claim 10 wherein the accessory power demand comprises a passenger cabin heating request.

13. The method of claim 10 wherein the predetermined battery charge rate is based on a brake specific fuel consumption of an engine.

* * * * *